United States Patent [19]
Valdespino

[11] 3,752,270
[45] Aug. 14, 1973

[54] SHOCK ABSORBER STRUCTURE INCLUDING FLEXIBLE BLADDER MEANS

[76] Inventor: Joseph M. Valdespino, 5023 Golf Club Parkway, Orlando, Fla. 32808

[22] Filed: Dec. 29, 1971

[21] Appl. No.: 213,473

[52] U.S. Cl. ............ 188/281, 188/298, 188/322
[51] Int. Cl. ............................................. F16f 9/18
[58] Field of Search .............. 188/281, 298, 313, 188/314, 315, 322; 267/64

[56] References Cited
UNITED STATES PATENTS

| | | | |
|---|---|---|---|
| 2,317,028 | 4/1943 | Chappell et al. | 188/298 X |
| 1,519,451 | 12/1924 | Harris | 188/313 X |
| 1,572,484 | 2/1926 | Homar | 188/313 |
| 2,943,711 | 7/1960 | Rossman | 188/322 |
| 3,013,816 | 12/1961 | Isham | 188/298 X |

*Primary Examiner*—George E. A. Halvosa
*Attorney*—Duckworth & Hobby

[57] ABSTRACT

A vehicle shock absorber for dampening spring oscillations on a vehicle having a pair of bladders located in a casing and separated by a dividing member. The shock absorber may be attached between the body of a vehicle and its wheel suspension, whereby movement of the wheel suspension will move the dividing member between the bladders against one or the other bladder forcing a fluid in the bladders to flow therebetween through a bladder connecting member. A valve allows the fluid to flow easier in one direction than the other, or the valve may be eliminated by the choice of bladder material and design whereby a shock absorber is provided which may be of tubular design without having the usual fluid seals.

7 Claims, 9 Drawing Figures

Patented Aug. 14, 1973
3,752,270
2 Sheets-Sheet 1
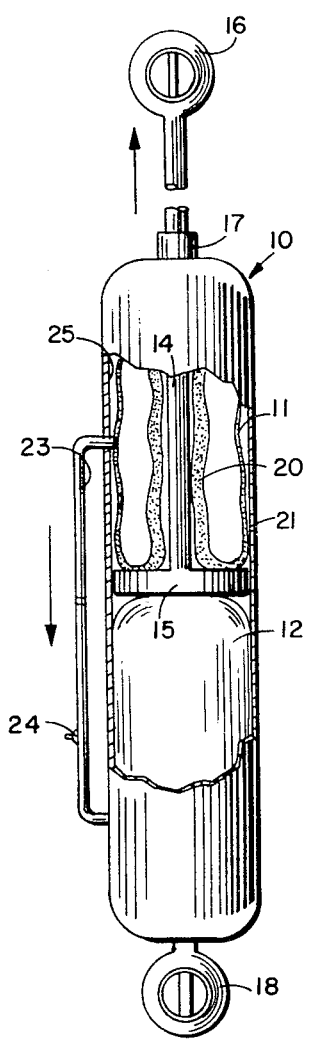
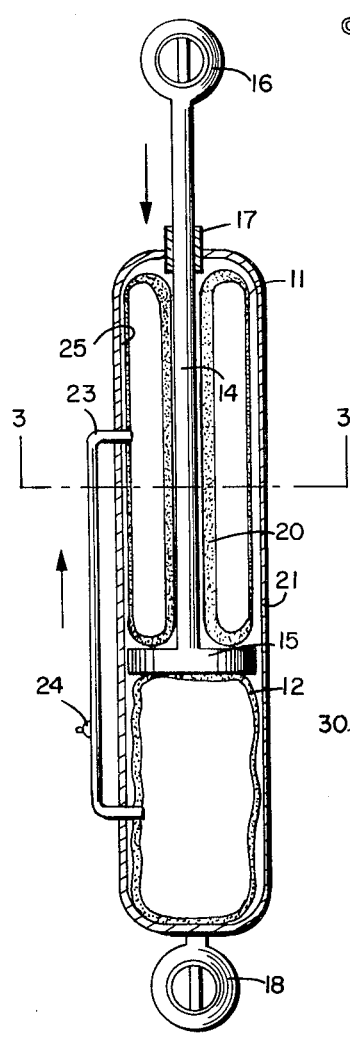
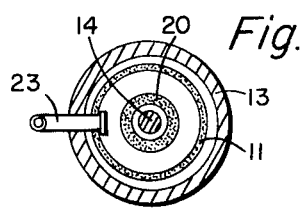
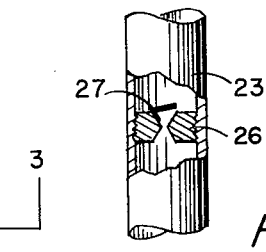
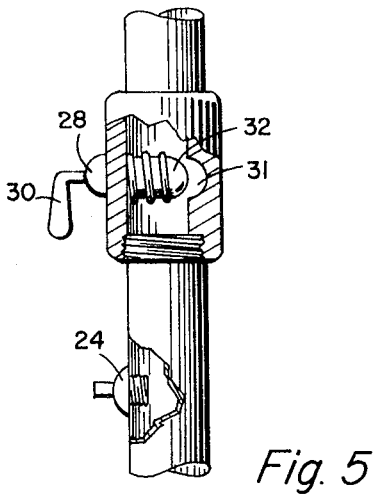
INVENTOR.
Joseph M. Valdespino
BY Duckworth & Hobby
ATTY'S.

Patented Aug. 14, 1973

INVENTOR.
Joseph M. Valdespino

SHOCK ABSORBER STRUCTURE INCLUDING FLEXIBLE BLADDER MEANS

BACKGROUND OF THE INVENTION

The present invention relates to shock absorbers and especially to a shock absorber for dampening spring oscillations in the suspension system of vehicles while eliminating seals used to prevent the loss of a fluid in the shock absorber.

Vehicle shock absorbers are commonly used between the body of a vehicle and the wheel suspension for dampening the objectionable spring oscillations resulting from movement of the wheel over a road surface. Most modern day shock abosrbers are of the hydraulic type having a piston moving inside a cylinder and forcing oil through small openings to create high resistance to the movement of a piston thereby dampening the oscillations of the spring. Older vehicles used a shock absorber having a piston that travels in a transverse manner in an oil filled casing and having the piston connected to the axle of the vehicle through a lever system. However, the type of shock absorber most commonly used nowadays is frequently referred to as the telescopic shock absorber and has a pair of tubes, one fitting inside the other with a piston rod being connected to the outer tube so that the piston moves in an oil filled inner chamber of the inner side tube. The piston normally contains a pair of check-valves which alternately allow the hydraulic fluid to pass in one direction only. It is desirable that the upward movement must be only slightly damp in order not to impair the spring action, and therefore a valve with a larger orifice is accordingly used to allow the hydraulic fluid to escape quickly so that only small damping is obtained. On the other hand, the return motion of the spring of the vehicle must be damped to a much greater extent and for this reason a much narrower orifice is used for the other valve which opens when the piston travels in the opposite direction, whereby the shock absorber intensity of damping in each direction is substantially different. This type of prior art shock absorber has worked satisfactorily but has generally required replacement after a period of time due to wearing of the seals which prevent fluid from escaping around the piston rod and thus allowing some fluid to escape, reducing the effectiveness of the shock absorber.

It is accordingly one object of the present invention to provide a shock absorber without requiring seals and adapted to have a longer life while being economical to manufacture for replacement of existing shock absorbers.

In the past, a number of systems have been provided for producing fluid actuated springs or hydraulic shock absorbers utilizing expandable sections. One such device is seen in U. S. Pat. No. 3,151,856 for HERMETICALLY SEALED LIQUID SPRINGS utilizing a pair of bellows flowing from one to the other through a chamber passing through the piston rod. This system, however, provides a piston to move to and fro in the hydraulic fluid and requires delicate attachment of the deformable sections to the rigid casing. Another HYDRO-PNEUMATIC SUSPENSION DEVICE can be seen in U. S. Pat. No. 3,331,601, having annular control diaphragms connected at predetermined points within a suspension device for expanding and collapsing against the walls of the device. Other devices using flexible containers and suspension devices can be seen in U.S. Pat. No. 2,256,835, for OLEOPNEUMATIC DEVICE; U.S. Pat. No. 3,410,549, for a VEHICLE SUSPENSION system having an accumulator for compressed gas; U.S. Pat. No. 3,206,185 for a SUSPENSION SYSTEM AND APPARATUS FOR SUPPORTING A STRUCTURE, having a flexible boot and a cylindrical flexible diaphragm therein, utilizing a combination of gas and oil and requiring seals therein; U.S. Pat. No. 2,688,150 for a VARIABLE VOLUME CHAMBER, providing for a dampening system having a yielding seal chamber or bladder therein; and U.S. Pat. No. 3,226,103 for a FLUID SPRING AND SHOCK ABSORBER having a collapsible air bag for separating a compressed air chamber from the remaining portions of a chamber.

SUMMARY OF THE INVENTION

The present invention relates to vehicle shock absorbers especially those shock absorbers for dampening spring oscillations between the vehicle body and the wheel suspensions. A casing is provided which may be tubular shaped and has a bladder located at each end enclosing a predetermined amount of liquid in each bladder. The bladders are flexible or collapsible and are connected to each other by a tube, or the like, so that the fluid may flow from one bladder to the other. A dividing member is located between the bladders and is connected to the vehicle at one point, while the casing is attached to the vehicle at a second point so that movement of the vehicle suspension relative to the vehicle body will move the dividing member relative to the casing, thus driving the bladder dividing member against one of the bladders collapsing it and driving the fluid therein into the other bladder expanding the other bladder. A valve located in the connecting tube between the bladders allows the fluid to flow more freely in one direction than the other, whereby the dividing member between the bladders is damped more in one direction than in the second. The casing may be lined on the interior with teflon to prevent wear on the bladders during the operation of the shock absorbers, and means are provided for increasing or decreasing the dampening action of the shock absorber. One embodiment provides a pair of bladders not requiring a connecting tube and valve by the selection of bladders having different intensities of damping.

BRIEF DESCRIPTION OF THE DRAWINGS

Other objects, features and advantages of this invention will be apparent from a study of the written description and the drawings, in which FIG. 1 is a cutaway sectional view of a shock absorber in accordance with the present invention;

FIG. 2 is a side sectional view of the shock absorber of FIG. 1 in a second operating condition;

FIG. 3 is a sectional view taken along line 3—3 of FIG. 2;

FIG. 4 is a side sectional view of a section of the connecting tube between the bladders of the shock absorber of FIGS. 1–3;

FIG. 5 illustrates a section of the connecting tube between the bladders with means for restricting the passage of fluid therethrough;

DESCRIPTION OF THE PREFERRED EMBODIMENTS

Figure 9:
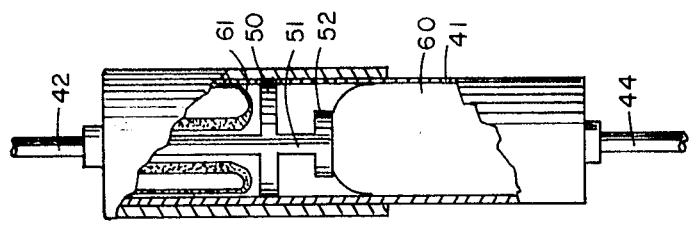
FIG. 9 is a cutaway sectional view of another embodiment of the present invention.

Referring now to FIG. 1 of the drawings, there is seen a shock absorber 10 having a bladder 11 and a bladder 12 located inside of casing 13. The bladder 11 is shown as being generally donut or annular shaped to allow a rod 14 to pass therethrough. Rod 14 is connected to a bladder dividing member 15 and has an attaching member 16 on the other end thereof, and passes through the casing 13 at an opening and guide bushing 17. Casing 13 also has an attaching member 18 fixedly attached to the opposite end of attaching member 16 so that either member 16 or 18 can be attached to the wheel suspension with the other attaching member being attached to the vehicle body for dampening the action of the spring of the vehicle while the vehicle rides over a bump or uneven portion of a road, or the like. Bladders 11 and 12 may be made of any flexible material desired such as a surgical rubber, neoprene, or the like, so long as the material is adapted to collapse and re-expand over long periods of time without fracture. The upper bladders 11 are illustrated having an interior portion 20 which is thicker than the exterior portion 21 for providing a better collapsing action thereof. Tube 23 connects bladders 11 and 12 together for allowing fluid in the otherwise sealed bladders to flow therebetween, and a valve 24 connected to the tube 23 allows fluid to be added or taken away from the shock absorber without otherwise damaging the shock absorber. It should also be noted that a feature of the present invention provides the inner surface 25 to be coated with a solid lubricant such as Teflon so that the bladders 11 and 12 will not be damaged through excessive abrasion between the bladders and the walls of the casing 13. FIG. 1 has the dividing member 15 being driven against the bladder 11 thereby collapsing a portion of this bladder and driving the fluid into bladder 12 which is shown fully expanded, while FIG. 2 has the bladder 11 fully expanded having driven the fluid from bladder 12 which is partially collapsed.

It should of course be realized that any type of fluid desired could be used including gases or liquids, but inasmuch as gas offers a reduced resistance in its flow, a liquid has generally been preferred.

Referring now to FIG. 3, a cross section of the shock absorber 10 is illustrated having the casing 13 surrounding the bladder 11 which has an inner surface 20 allowing the rod 14 to to ride therethrough and also has a connection tube 23 connected to the bladder through the walls of the casing 13.

In FIG. 4, a tube 23 can be seen as having a check or flat valve 26 therein which valve is adapted to allow the fluid to flow by opening in one direction, and when closed, in the second direction. A small opening 27 in the flap or check portion of the valve allows much more limited flow in the opposite direction.

FIG. 5 shows a cutaway portion of the valve 24 for adding or removing fluid from the system and also of another cock-type valve 28 having a handle 30 which may be rotated to reduce the passage 31 through tube 23 to vary the action of the shock absorber in both directions simultaneously by screwing the closure portion 32 into and out of the valve section.

Figure 6:
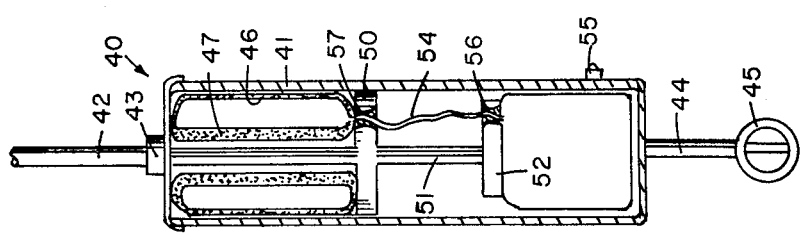
FIG. 6 shows a cutaway side sectional view of another embodiment of the present invention.

Turning now to FIGS. 6 through 9, several embodiments of a shock absorber in accordance with the present invention are illustrated in which FIG. 6 has a shock absorber 40 having a casing 41 which is tubular in shape and with a shaft 42 passing through an opening and guide bushing 43. The casing has a shaft 44 connected to the opposite end from shaft 42 and has a connecting means 45 for connecting the shock absorber at one end to one portion of the vehicle. Shaft 42 extends into the casing 41 through an annular bladder 46 which has a thicker interior portion 47 than the exterior portion. Shaft 42 connects to a disc member 50 which in turn has a shaft 51 connecting it to a smaller disc 52 which is held against a second bladder 53, so that disc 50 engages the bladder 46 while disc 52 engages the bladder 53. The bladders are interconnected by a flexible hose 54 passing through disc 50 and disc 52 which allows the gas or liquid located in bladders 46 and 53 to pass between each other as the shaft 52 forces the discs 50 and 52 up and down within the casing 41. A valve member 55 may also be provided for adding or removing gas from the bladders 46 and 53 and a valve may be placed either in the opening 56 in disc 52 or opening 57 in disc 50 to vary the rate of flow between the two directions of flow between the bladders 53 and 46. It should, however, be clear that other means can be provided for varying the resistance to the movement of the shaft in either direction such as utilizing a stiffer rubber in a bladder 53 than in the bladder 46 so that when bladder 52 is forced downward the bladder 53 will curl inward providing a certain amount of resistance in one direction which may be different from the resistance to the movement of the shaft 42 in the opposite direction. It should also be clear that, in this embodiment as in the other embodiments, the casings can be teflon lined to prevent wear and abrasion on the bladders thereby providing longer life to the shock absorber.

FIG. 9 is a shock absorber in accordance with FIG. 6 except for the absence of the tube 54 passing therebetween and which relied solely on the difference of the stiffness of the rubber and the different designs between the bladders 60 and 61 to provide the variation between the motion in each direction. This shock absorber, similar to the embodiment of FIG. 6, has the same casing 41 with shaft 42 feeding through a donut shaped bladder 62 and connected to a large disc 50 which is in turn connected by means of a shaft 51 to a smaller disc 52 and has a lower shaft 44 for connection to the vehicle body.

Figure 8:
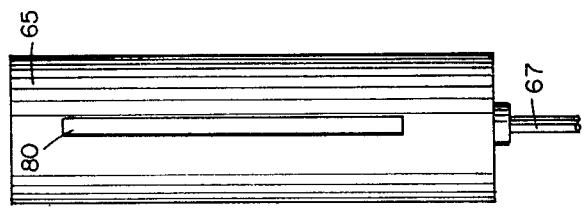
FIG. 8 shows a sectional view of the casing of the embodiment in accordance with FIG. 7.
Figure 7:
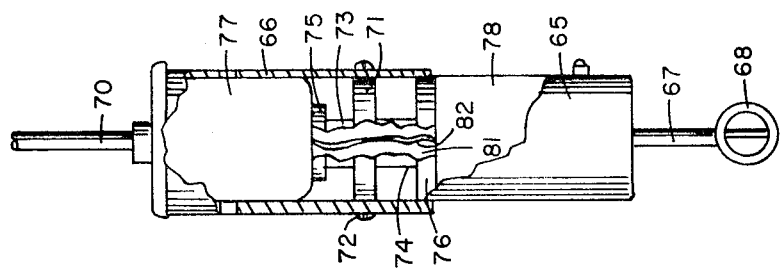
FIG. 7 shows a side sectional view of another embodiment.

FIGS. 7 and 8 show yet another embodiment of the present invention, having a casing 65 with a second telescoping case 66 telescoping over casing 65. Casing 65 has a shaft 67 with a vehicle connector 68 attached thereto and an upper shaft 70 connected to the upper telescoping portion 66. A central disc 71 is connected to the outer telescoping portion 66 by use of members 72, and is also connected by means of hollow shafts 73 and 74 to discs 75 and 76 respectively. Disc 77 rides against a bladder 77 while disc 76 rides against a bladder 78 located in the casing 65. A slot 80 in the side of the casing 65 allows the members 72 to be threaded through the casing 65 and to slide in the slot 80. The hollow portion 81 passing through the shafts 73 and 74 allowing a tube 82 to pass therethrough, interconnecting tubes 77 and 78. This embodiment anticipates a variation in the resistance in the rubber portions and the bladders 78 and 77 to provide the differential between the directions of travel of the shaft 70. This embodiment eliminates the use of the annular bladder of the other embodiments while allowing the bladder system to be utilized in a tubular shock absorber having one element telescoping over a second casing element.

It should be realized at this point that a shock absorber has been provided which has eliminated the need for fluid type seals in a system having fluids being totally sealed in. A system has also been illustrated having means for adding or deleting fluid and varying the flow of the fluid between a pair of bladders to provide additional controls in the dampening action of the shock absorber. However, it should be clear to those skilled in the art that other embodiments are contemplated and that this invention is not to be construed as limited to the particular forms disclosed herein since these are to be regarded as illustrative rather than restrictive.

I claim:

1. A vehicle shock absorber comprising in combination:
   a. casing means having two end portions;
   b. connecting means connected to said casing for attaching said casing to a vehicle;
   c. a pair of flexible bladders, each said bladder being located in one end of said casing, and each said bladder being at least partially filled with fluid;
   d. movable bladder engaging means dividing said pair of bladders and adapted to move against either said bladder, said movable bladder separating means being connected to said vehicle in a manner that the wheel suspension of said vehicle will move said bladder engaging means relative to said casing means when said wheel suspension is placed in motion; and one said bladder having a greater resistance to the movement of the bladder separating means than the other said bladder, whereby dampening in each direction is substantially different; and
   e. said bladder engaging means having a pair of connected disc members, one said disc being smaller than the other said disc.

2. The apparatus in accordance with claim 1 in which the casing means has an interior portion thereof coated with Teflon.

3. The apparatus in accordance with claim 1 in which bladder connecting means passes through said bladder engaging means to operatively connect said bladders.

4. The apparatus in accordance with claim 1 in which a shaft connects said bladder engaging means with said vehicle.

5. The apparatus in accordance with claim 4 in which one said flexible bladder is annular shaped and surrounds the said shaft.

6. The apparatus in accordance with claim 4, in which said smaller disc member is adapted to curl one said bladder inward upon said separating means being driven thereagainst.

7. The apparatus in accordance with claim 6 in which said connecting means includes a telescoping member telescoping over said casing.

* * * * *